UNITED STATES PATENT OFFICE.

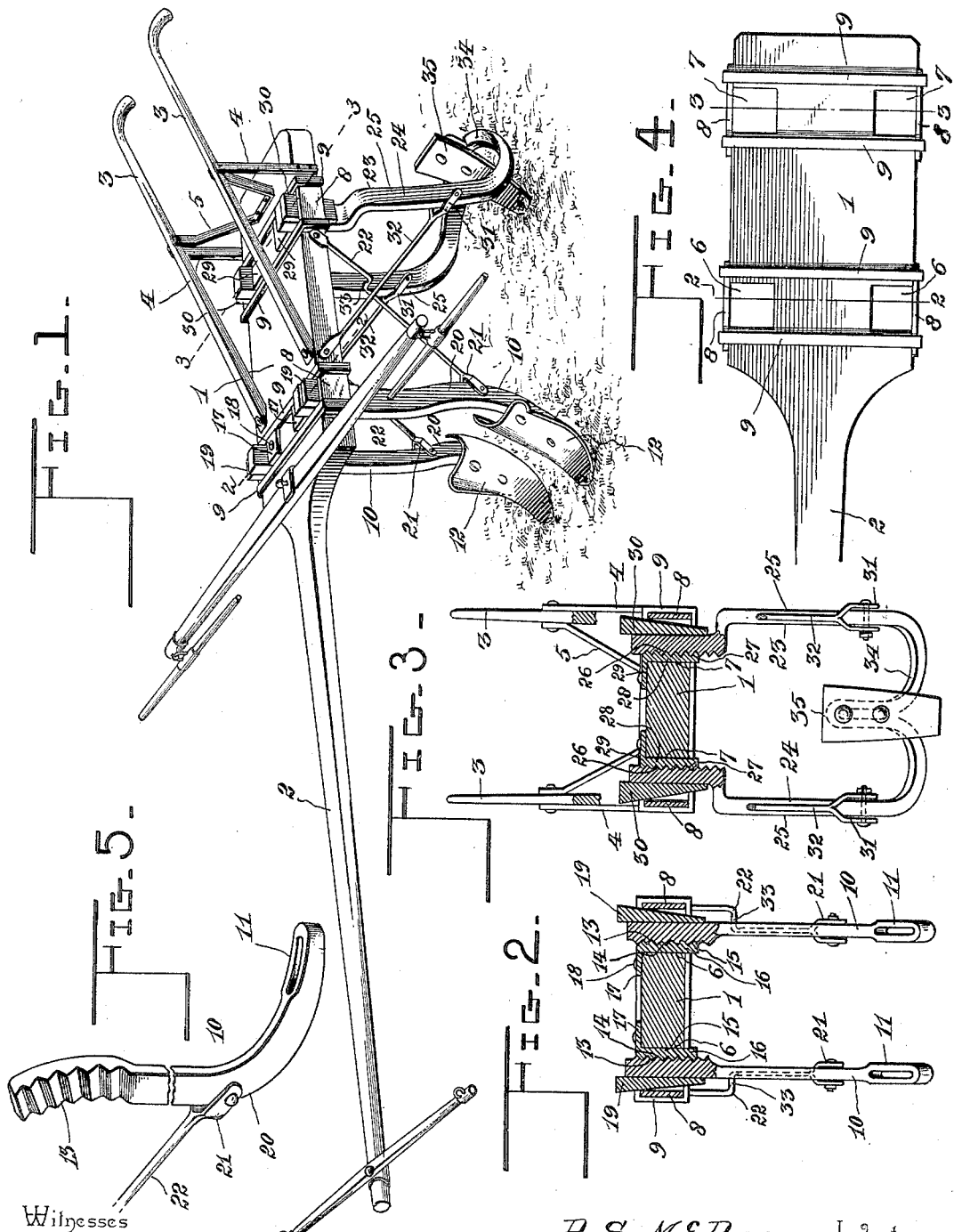

PHILIP S. McRAE, OF MORVEN, GEORGIA.

PLOW.

SPECIFICATION forming part of Letters Patent No. 649,944, dated May 22, 1900.

Application filed December 2, 1899. Serial No. 738,992. (No model.)

*To all whom it may concern:*

Be it known that I, PHILIP S. MCRAE, a citizen of the United States, residing at Morven, in the county of Brooks and State of Georgia, have invented a new and useful Plow, of which the following is a specification.

This invention relates to plows adapted for use in breaking up the soil and removing stalks, and also in barring off and clipping cotton-stalks, and has for its objects to provide a simple and effective device having therein adjustable features to adapt the same to various uses by a simple manipulation, depletion of some of the parts, and substitution of various kinds of plows to facilitate the performance of the work desired to be carried on without requiring a number of separate machines or devices, and thereby materially economize in the expense of time, labor, and cost of agricultural devices.

Other objects and advantages will appear in the subjoined description, and the novelty will be pointed out in the appended claims, the preferred form of the improvement being illustrated in the accompanying drawings, wherein—

Figure 1 is a perspective view of a plow embodying the features of the invention. Fig. 2 is a transverse vertical section on the line 2 2 of Fig. 1. Fig. 3 is a transverse vertical section on the line 3 3 of Fig. 1. Fig. 4 is a top plan view of the bed-beam. Fig. 5 is a detail perspective view of one of the front standards.

Similar numerals of reference are employed to indicate corresponding parts in the several views.

The numeral 1 designates a bed-beam which is broad enough to accommodate the proper spacing in a transverse direction of the parts applied thereto and also long enough to facilitate the application of some of the parts at a predetermined longitudinal distance from others. This bed-beam 1 has projecting from the front portion thereof a tongue 2, which is adapted to be provided with a breast-tree, as shown, and on the forward extremity of said bed-beam a doubletree is also mounted to adapt the plow to two draft-animals. Handles 3 are also bolted or otherwise fastened to the forward portion of the bed-beam 1 and extend rearwardly at an upward incline and attached to upstanding posts 4, rising from the rear portion of said beam, a transverse brace 5 being used to keep the said handles spaced apart at a predetermined distance in a transverse direction.

The bed-beam 1 has front and rear pairs of squared openings 6 and 7 cut therethrough in a vertical direction and open out through the opposite side edges of said beam. The open portions of the openings 6 and 7 are covered by suitable metallic plates 8, which are firmly held in place by parallel bands 9, surrounding the bed-beam in an immovable manner and also serving to strengthen the portions of said beam where they are applied and at points where the greatest strain is brought to bear thereon. In the openings 6 standards 10 are adjustably mounted and are of a less dimension in one direction than the said openings to permit the insertion in the latter of adjusting and holding devices. The said standards have lower angularly-disposed slotted feet 11, on which are removably secured any preferred form of plow or plow-blades 12, those being shown in Fig. 1 having an operation to throw the soil inwardly and combining somewhat the features of shovel and turning-plows. The precise form of these plows or plow-blades is not essential in view of the fact that they will be replaced by others of a different nature to accommodate the performance of different kinds of work, and to vary the penetration of the said plows the standards 10 are vertically adjustable and have on the inner upper extremities thereof a series of clutch-teeth 13, which are adapted to engage or coincide with similar teeth 14 on angle-dogs 15, movably supported on the bed-beam 1 and in the main depending through the opening 6. To strengthen the upper extremities of the standards 10 and provide for the formation of the teeth 13, the metal is thickened in a transverse direction, and likewise the depending members 16 of the dogs 14 are thicker than the horizontal members 17 of said dogs. The horizontal members 17 of the dogs 15 are connected to the beam by bolts 18, and the depending members 16 extend downwardly far enough to produce a firm lock in each instance with the upper extremities of the standards. After the adjustment desired has been obtained between the upper extremities of the standards and the dogs wedges 19 are driven into the outer portions of the openings 6, against the straight outer sides of the said standards, to prevent the latter from moving from the position in which it is desired they shall remain. To vary the pitch of the plows or plow-blades 12, the upper extremities of the standards 10 are also curved rearwardly, as at 20, and the arc in which each curve is made will be calculated to give the plows or plow-blades an angle corresponding to the extent of their elevation or depression through the adjusting devices set forth. Connected to the lower rear portions of the standards 10 are the front yoked ends 21 of retention-rods 22, which have their opposite ends pivotally attached to the opposite side edges of the bed-beam, said rods serving to prevent the standards from being pulled away from the bed-beam under ordinary conditions and also bracing the same in a direction of the greatest strain.

In the openings 7 the terminals 23 of a yoke-standard 24 are adjustably mounted and stand inwardly from the main side arms 25 of the said yoke-standard. The terminals 23 are transversely thickened and formed with clutch-teeth 26 on their inner faces to coincide and interlock with clutch-teeth 27, on the depending members 28 of dogs 29, similar to the dogs 16 heretofore described. Wedges 30 are also used for clamping purposes in this instance, which are applied similar to the wedges 19, and to the main arms 25 the rear yoked ends 31 of rods 32 are attached and have their front ends movably secured to the opposite edges of the beam 1. At the points where the rods 32 cross the rods 22 the latter are angularly bent, as at 33, to permit a close fitting of the two rods without binding or interference in order that the adjustment of the separate standards may take place without difficulty. The yoke 24 has considerable width in view of the inward position of the terminals 23 thereof and is afforded a wide sweep and adapted to receive various kinds of implements. The bow 34 of the said yoke is deflected rearwardly in a horizontal plane and slightly twisted to accommodate the attachment of a plow 35 thereto. This plow in the preferred use of the device will be of a square end-cutting form, so as to sever cotton-stalks or other analogous growths at any depression and which can be accomplished by vertically adjusting the said yoke through the movement of the terminals 23 over their dogs. The form of plow-blade which may be applied to the bow 34 of the yoke 24 is not limited to any precise contour, and it is intended that the entire plow may have various forms of plow-blades or analogous implements applied to the standards to adapt the improved device for various uses. For this purpose the foot 11 will be modified within the purview of the invention and to accommodate the application of different forms of plows.

The improved plow is adapted for use in the general cultivation of the soil, and particularly for barring off and clipping or cutting cotton-stalks at any desired depth. The soil may also be bedded out by the substitution of what is known as a "round shovel" and adapt the device for bedding a row at every run through. When land is to be broken broadcast, the rear yoke-standard is removed and the left-hand front standard is shifted to the rear, plow-blades like those shown and designated by 12 being used in similar form on the two standards.

Some of the most prominent advantages of the improved plow are its simplicity, durability, lightness of draft, and the good quality and increased quantity of work that can be accomplished by the same, as well as the ease with which it can be managed. To suit different applications, changes in the form, proportion, and minor details may be resorted to without in the least departing from the spirit or sacrificing any of the advantages of the invention.

Having thus described the invention, what is claimed as new is—

1. In a device of the character set forth, the combination of a bed-beam having pairs of openings therethrough at the front and rear extremities, separate standards adjustably mounted in the front pair of openings and having cultivating devices thereon, and a yoke-standard having portions thereof adjustably mounted in the rear pair of openings and also provided with a cultivating device.

2. In a device of the character set forth, the combination of a bed-beam having front and rear pairs of openings therein, dogs with depending portions extending into the said openings and provided with clutch-teeth, separate standards provided with clutch-teeth on the upper extremities thereof to adjustably coincide with the teeth on the depending portions of the said dogs and provided with cultivating devices, a rear yoke-standard having portions similarly adjustable in the rear openings and with dogs having a like construction as those in the front openings and a cultivating device carried by the said yoke-standard.

3. In a device of the character set forth, the combination of a bed-beam having front and rear pairs of openings therein, separate standards carrying cultivating devices adjustably mounted in the said front pair of openings, a rear yoke-standard having opposite portions adjustably mounted in the rear pair of openings and provided with a cultivating device, said parts being removable and interchangeable, and means for bracing the standards.

4. In a device of the character set forth, the combination of a bed-beam, front and rear standards adjustably and removably mounted therein, and brace-rods movably attached to opposite sides of said bed-beam and the said standards.

5. In a device of the character set forth, the combination of a bed-beam having front and rear standards adjustably and removably mounted therein, opposite rods movably connected to the sides of the bed-beam and the front standards and having angular deflections at intermediate points, and other side rods connected to the opposite portions of the rear standards and the sides of the bed-beam, the said latter rods crossing the first-mentioned ones.

6. In a device of the character set forth, the combination of a bed-beam having front and rear pairs of openings extending therethrough, plates forming the outer end walls for the said openings, metallic bands surrounding the said bed-beam and engaging the opposite extremities of the plates, and standards adjustably mounted in the said openings and having cultivating devices thereon.

In testimony that I claim the foregoing as my own I have hereto affixed my signature in the presence of two witnesses.

PHILIP S. McRAE.

Witnesses:
J. H. MILLER,
L. W. WILLIAMS.